United States Patent [19]

Yagnik et al.

[11] Patent Number: 4,645,906
[45] Date of Patent: Feb. 24, 1987

[54] REDUCED RESISTANCE SKIN EFFECT HEAT GENERATING SYSTEM

[75] Inventors: Chandrakant M. Yagnik, Austin; David C. Goss, San Marcos, both of Tex.

[73] Assignee: Thermon Manufacturing Company, San Marcos, Tex.

[21] Appl. No.: 707,959

[22] Filed: Mar. 4, 1985

[51] Int. Cl.$^4$ ............................ F16L 53/00; H05B 3/00
[52] U.S. Cl. .................................... 219/301; 137/341; 138/33; 219/10.49 R; 219/300; 219/541; 219/553
[58] Field of Search ............... 219/300, 301, 10.49, 219/10.51, 541, 552, 553, 495, 10.79; 137/341; 138/33

[56] References Cited

U.S. PATENT DOCUMENTS

| | | | |
|---|---|---|---|
| 3,515,837 | 6/1970 | Ando | 219/10.51 |
| 3,522,440 | 8/1970 | Ando | 307/38 |
| 3,575,581 | 4/1971 | Ando | 219/10.51 |
| 3,632,975 | 1/1972 | Ando et al. | 219/300 |
| 3,755,650 | 8/1973 | Ando | 219/301 |
| 4,256,945 | 3/1981 | Carter et al. | 219/495 X |
| 4,280,045 | 7/1981 | Blackmore | 219/540 |
| 4,303,826 | 12/1981 | Ando | 219/301 |
| 4,334,142 | 6/1982 | Blackmore | 219/301 |

FOREIGN PATENT DOCUMENTS

| | | | |
|---|---|---|---|
| 899987 | 5/1972 | Canada | 219/301 |
| 2084284 | 4/1982 | United Kingdom | 219/301 |
| 540102 | 4/1982 | U.S.S.R. | 219/301 |

OTHER PUBLICATIONS

"Electric Pipe Line Heating-Skin Effect Current Tracing", 5/3/73, Ric-Wil Incorporated, Brecksville, Ohio 44141.
"SECT System", by Chisso Engineering Co. Ltd., Sect. Dept.
"Selectra Pipeline Heating Systems", Bulletin No. SE 1815M, 1980, TPCO Inc., Monmouth Junction, New Jersey.
"The Condensed Chemical Dictionary", Tenth Edition, Gessner G. Hawley, 1981, p. 284.
"CRC Handbook of Chemistry and Physics", (56th Ed., 1975) p. E-120.
"Thermon Electric Tracing Products", Form S-210, 11/1985, Thermon Manufacturing Co., San Marcos, Texas.

*Primary Examiner*—Anthony Bartis
*Attorney, Agent, or Firm*—Pravel, Gambrell, Hewitt & Kimball

[57] ABSTRACT

A skin effect heat generating pipe for use with a low frequency alternating current source includes a ferromagnetic pipe (e.g., steel) having thickness substantially greater than the penetration depth of the current of the frequency of the power source. A shunt conductor in the form of an electrically conductive metal layer (e.g., copper) is applied as a discrete layer to the inner surface of the pipe and in electrical contact therewith throughout the length of the shunt conductor, thereby forming a parallel resistance circuit wherein both the shunt conductor and pipe each are capable of conducting substantial current. One end of the pipe is electrically connectable to a first terminal of the power source. A return conductor installed in the pipe and electrically insulated therefrom has one end electrically connected to the second end of the pipe and its other end electrically connectable to the other terminal of the power source. The return conductor can be formed as a discrete inner liner conformed to the inner surface of the layer forming the shunt conductor. The shunt conductor allows a lower voltage level for a given pipe length or a longer pipe length for a given voltage level at the same power output levels.

9 Claims, 5 Drawing Figures

REDUCED RESISTANCE SKIN EFFECT HEAT GENERATING SYSTEM

BACKGROUND OF THE INVENTION

1. Field of the Invention

The present invention relates to heat generating pipes that use the skin effect of an alternating current to allow heating of the entire pipe and yet have electrical conduction in only a small area.

2. Description of the Prior Art

It has long been known that it is highly desirable to heat a pipeline through which viscous fluids such as crude oil are being pumped. This greatly reduced the power and complexity of the pumps required to pump the fluids. There are several techniques that have been used to do this. A common example was steam tracing where a steam line was attached to the process pipe that was to be heated.

One other technique used to heat the pipeline was a skin effect heat generating pipe. This general concept was disclosed in U.S. Pat. No. 3,293,407. This patent disclosed the use of a ferromagnetic pipe with an internal non-magnetic electrical return conductor. This technique used alternating current which flowed only on the inside surface of the ferromagnetic pipe due to the skin effect. The pipe was heated as a result of electrical resistance, hysteresis and eddy current effects. This heat was thermally conducted to the outside of the pipe which remained at ground potential because of the skin effect. This conducted heat was transferred to the liquid if the pipe was inside the pipeline or was conducted to the pipe that comprised the pipeline and then transferred to the fluid. There were several disadvantages to this simple and straightforward technique. As pipelines grew longer the energizing voltage required to maintain a given power output per unit length increased. At certain pipeline lengths the required voltage exceeded the dielectric strength of the preferred insulations used on the internal return conductor.

One technique that was used to partially solve this problem was disclosed in U.S. Pat. No. 3,718,804. This patent disclosed the provision of a small gap between the heat generating pipe and the process pipe. The purpose of this gap was for arc suppression in case the dielectric of the return conductor broke down and began arcing over to the ferromagnetic heat generating pipe. The gap was provided to prevent arcing and the concomitant boring of holes in the process pipe which could lead to catastrophic results. This was, however, only a partial solution that alleviated one of the more severe possible results of insufficient insulation.

Another attempt to solve the insulation problem was disclosed in U.S. Pat. No. 3,524,996. This reference disclosed the use of a step-wise reduction in the dielectric strength of the insulation as the distances from the alternating current power supply source increased. This could be done because of the voltage difference generated in the ferromagnetic pipe and the electric conductor due to resistance, therefore reducing the voltage difference between the ferromagnetic pipe and the return electric conductor and reducing the needed dielectric strength of the insulation on the return conductor.

Other efforts in this area have concerned locally controlling the heat generation of a section of heat generating pipe. One example is evidenced in U.S. Pat. No. 3,575,581. This reference disclosed the use of a low resistance internal conductor to short circuit the internal conductive surface of the ferromagnetic pipe. A similar technique with an external shorting conducting was disclosed in U.S. Pat. No. 4,142,093.

Another alternative was disclosed in U.S. Pat. No. 4,110,599. In this reference a section of the ferromagnetic pipe was removed and replaced with an electrically conductive and non-ferromagnetic pipe having a significantly lesser heating effect. Yet another approach was disclosed in U.S. Pat. No. 4,132,884. This reference disclosed removing a section of the ferromagnetic pipe and replacing it with a non-conductive section. An additional insulated internal conductor would be used to conduct the current across the nonconducting section and between the two adjacent sections of ferromagnetic pipe.

These references were only intended to stop the heating in a given area and were not intended to reduce or solve any voltage or dielectric strength problems.

U.S. Pat. No. 4,256,945 disclosed the use of a substrate made of a non-magnetic material having high thermal and electrical conductivity clad with a surface layer of ferromagnetic material of relatively low electrical conductivity. This composite was used in a heating element. A high frequency power source was applied to the heating element to cause the ferromagnetic material to conduct and heat up. As the temperature of the ferromagnetic material increased, the temperature would rise into the region of the Curie temperature of the ferromagnetic material where the magnetic permeability of the ferromagnetic material would decline. This decline in the permeability would lessen the skin effect, allowing the current to migrate into the higher conductivity and non-magnetic core, thereby causing a reduction in the heating effect and a cooling of the ferromagnetic material. This cooling would bring the ferromagnetic material temperature below the Curie temperature and the permeability would increase allowing the skin effect to increase, concentrating the current in the ferromagnetic material. Therefore it can be seen that this reference disclosed the use of the two materials to produce a constant temperature heating element based on the Curie temperature of the coating ferromagnetic material. This method was not suitable for a skin effect heat generating pipe in a standard application because the conductive layer was on the outside whereas in standard heat generating pipe the conductive layer of the ferromagnetic material is on the inside of the pipe and the outside surface is at ground potential. Further, the standard heat generating pipe requires a ferromagnetic material thickness several times greater than the skin effect depth, which was not true of the system disclosed in this patent. A final difference is that heat generating pipes preferably operate at low frequencies, generally 50 or 60 Hz, not at the higher frequencies disclosed in this reference.

SUMMARY OF THE INVENTION

The apparatus of the present invention is a novel technique to reduce the voltage required for a given heat output per unit length and thereby allow a longer pipe length for a given insulation rating or a lesser insulation rating for the same length pipe.

A standard skin effect heat generating pipe uses the inner surface of the pipe to conduct current down the length of the pipe and a nonmagnetic electrical conductor to return the current to the power source. The ferromagnetic pipe has a characteristic effective thickness that is dependent upon the frequency of the alternating current power source due to skin effect. This thickness determines the resistance of the pipe. The resistances of the pipe and the return conductor determine the voltage required to produce a given amount of power in a given length of pipe. As a longer length of pipe is used the voltage required to maintain identical levels of power per unit distance increases until the insulation costs become a limiting factor. The present invention uses a nonmagnetic electrical shunt conductor, electrically parallel to the inner surface of the ferromagnetic pipe, to reduce the effective resistance per unit length of the heat generating pipe and correspondingly the voltage required to produce a given amount of heat per unit length. The shunt conductor can be installed in either of two ways. One way is to use an insulated conductor that is connected to the pipe at both ends. Alternatively a conductive inner surface or lining may be attached to the ferromagnetic pipe. In either of these cases the return conductor can be a standard insulated conductor. In the case where the shunt conductor is an inner liner it is also possible to use an insulated liner inside the shunt liner as the return conductor. The relative surface areas and therefore resistances of the ferromagnetic pipe, the shunt conductor and the return conductor may be varied depending upon the voltage reduction/length increase desired.

DESCRIPTION OF THE PREFERRED EMBODIMENT

Figure 1:
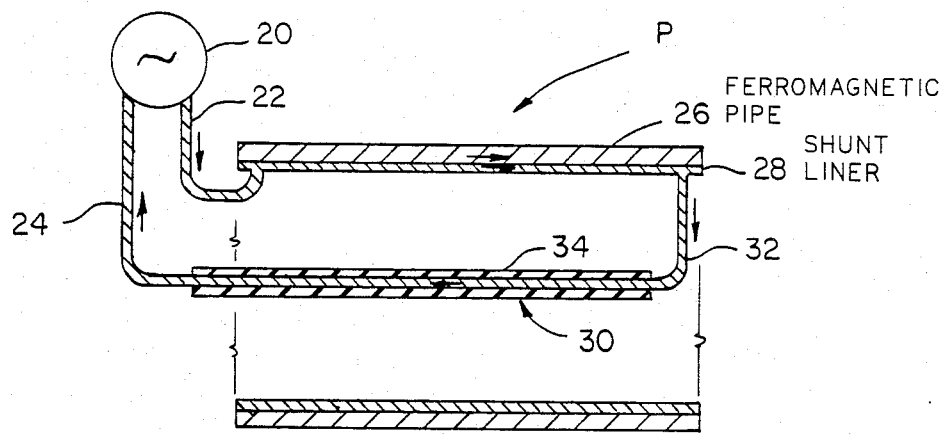
FIG. 1 is a schematic diagram of one embodiment of the present invention.

Referring to the drawings, the letter P generally designates the heat generating pipe of the present invention. FIG. 1 illustrates the electrical configuration of heat generating pipe P. An alternating current power source 20 is connected to heat generating pipe P by means of leads 22 and 24. Heat generating pipe P includes a ferromagnetic pipe 26 with a shunt liner 28, and an insulated return conductor 30. Power lead 22 is connected to heat generating pipe P such that when the system is energized electric current is conducted by shunt liner 28 and the inner surface of ferromagnetic pipe 26. Only the inner surface of ferromagnetic pipe 26 is conductive as will be explained later.

When the system is energized, current flows the length of ferromagnetic pipe 26 and returns via insulated return conductor 30 which is attached to shunt liner 28 and ferromagnetic pipe 26 at one end of heat generating pipe P. Insulated return conductor 30 includes conductor 32 and insulation 34. The thickness of insulation surrounding conductor 3 which determines its dielectric strength is sufficient to prevent arcing and corona discharge from return conductor 32 to shunt liner 28 and ferromagnetic pipe 26. Return conductor 32 is connected to return lead 24 of power source 20. Generally, shunt liner 28 and return conductor 32 are made from non-magnetic, conductive materials such as copper or aluminum.

Heat generating pipe P provides heat from three sources. The first is Joule law heating due to the resistance of ferromagnetic pipe 26. Other heating effects are derived from the hysteresis and eddy current losses that occur when an alternating wave form is applied to a ferromagnetic material. These three effects provide the majority of the heat generated in the system. Heat is also generated by the Joule law effect of shunt liner 28 and return conductor 32, but the heat generated by these sources is less than that generated by the ferromagnetic pipe 26 because of the lower relative resistances and lack of magnetic heating effects of these conductors.

Ferromagnetic pipe 26 has a resistance that is dependent upon the material resistivity and the frequency of the applied energy. As the frequency of alternating current carried in a conductor such as pipe 26 is increased, the current density in the conductor goes from a uniform density to a density that is concentrated in a thin layer of the wall of pipe 26. This is known as the skin effect and the skin or conducting layer depth is calculated by the following equation:

$$S = 5030 \sqrt{\frac{\rho}{\mu f}}$$

where
s = skin depth in cm
$\rho$ = material resistivity in ohm-cm
$\mu$ = material magnetic permeability
f = frequency in cycles/sec.

If the permeability of carbon steel is assumed to be 1000 and the resistivity is $18 \times 10^{-6}$ ohm-cm, then at 50 cycle/sec a ferromagnetic pipe will have a skin depth of approximately 0.10 cm. It is apparent that using a standard thick wall steel pipe will result in a very thin skin depth. If the conductive skin is on the inside of the pipe, the outside of the pipe will be at ground potential, as desired for a heat generating pipe system.

The skin depth combined with the resistivity of the steel results in a fixed resistance per unit length of the carbon steel pipe of a given diameter. This fixed resistance then permits the determination of the voltage or current necessary to generate a given amount of power per unit length. As the length of the pipe increases this characteristic resistance per unit length does not change and therefore the voltage required to maintain a constant power per unit length factor increases linearly.

One possible way to reduce the voltage needed for a given power per unit length or increase the power available in a unit length for a given voltage is to decrease the characteristic resistance per unit length. One way of doing this is to use parallel conductors, in this case a copper conductor and the ferromagnetic pipe 26. The ratio of the resulting resistance of the parallel steel and copper system as compared to the steel pipe alone is given by the following equation:

$$R_{TOTAL} = \frac{R_{cu+s}}{Rs}$$

and by transformation $$R_{TOTAL} = \frac{\frac{A_s \rho_{cu}}{A_{cu} \rho_s}}{1 + \frac{A_s}{A_{cu}} \frac{\rho_{su}}{\rho_s}}$$

where
 $A_s$ = area of steel
 $A_{cu}$ = area of copper
 $\rho_s$ = resistivity of steel
 $\rho_{cu}$ = resistivity of copper.

Using a value of $1.7 \times 10^{-6}$ ohm-cm for copper and assuming that the area of the steel is four times the area of the copper the resistance of the new pipe will be 30% that of the old pipe without the copper parallel conductor. Therefore it is clear that the voltage required to maintain a given power per unit length is dramatically decreased with the use of the parallel copper conductor. This will be further indicated in the details of the construction of the various embodiments.

Figure 2:
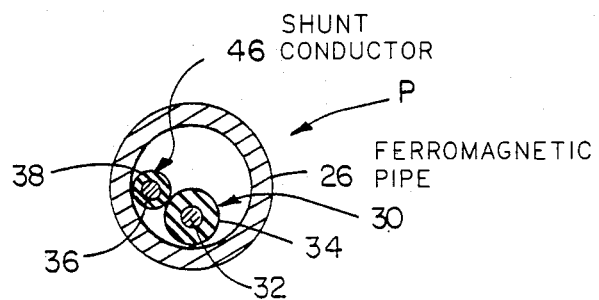
FIG. 2 is a cross-sectional view of an embodiment of a heat generating pipe according to the present invention utilizing a shunt conductor.

The simplest embodiment is shown in FIG. 2. In this embodiment, an insulated shunt conductor 46 is used in parallel with ferromagnetic pipe 26. The insulated shunt conductor 46 is comprised of shunt conductor 36 and insulation 38 surrounding conductor 36. Insulated shunt conductor 46 is attached to the ends of the ferromagnetic pipe 26 to create a parallel electrical circuit. By varying the size of insulated shunt conductor 46 it is possible as shown above to change the resistance reduction that occurs relative to ferromagnetic pipe 26 only situation. If a ¾ inch ferromagnetic pipe 26 is used with a #6 AWG copper return conductor 32 as a reference and a #12 AWG copper shunt conductor 36 is used there is a reduction from a voltage of 0.218 v/ft required to produce 26.8 W/ft to 0.159 v/ft to produce 17.6 w/ft. This is approximately an 18% reduction in the resistance per unit foot. The advantage of this embodiment is that it allows easy retro-fitting of the present invention to an existing conventional heat generating system.

Figure 3:
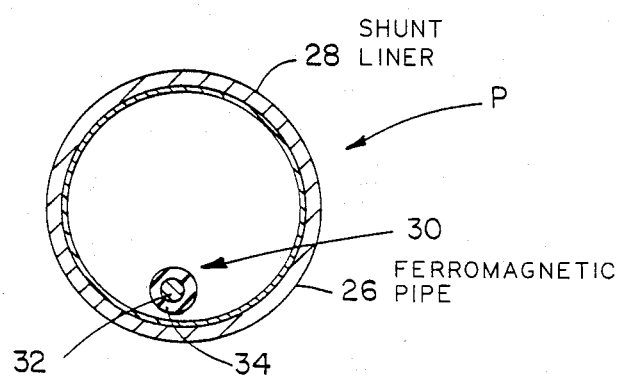
FIG. 3 is a cross-sectional view of an embodiment of a heat generating pipe according to the present invention utilizing a shunt liner.

FIG. 3 shows another embodiment of the present invention. In this case shunt conductor 46 has been replaced by a shunt liner 28. Shunt liner 28 can either be a coating or surfacing on the inner surface of ferromagnetic pipe 26 or can be a conductor that has been expanded to contact the inner surface of ferromagnetic pipe 26 therefore forming an inner liner. This expansion can easily be accomplished by inserting copper tubing inside a steel pipe and expanding the copper tubing until it contacts the steel pipe. This then forms a one piece unit to carry current in one direction with insulated return conductor 30 returning current to AC power source 20. It is also possible to use copper foil as a shunt liner 28. If a ¾ inch carbon steel pipe is used in a ferromagnetic pipe 26 and ¾ inch copper tubing is used as shunt conductor 28 this will result in a shunt conductor 28 thickness of approximately 0.035 inches. If a #2 AWG copper conductor is used as return conductor 30 the voltage required per unit length to generate the same wattage per foot will be 40-45% less as compared to ferromagnetic pipe 26 without shunt liner 28.

Figure 4:
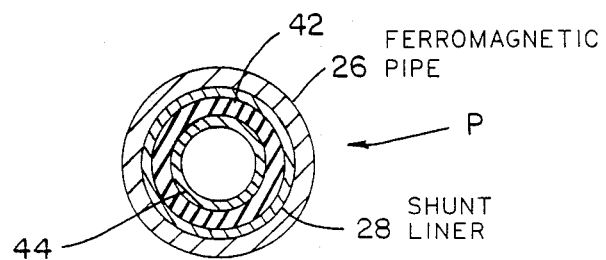
FIG. 4 is a cross-sectional view of an embodiment of a heat generating pipe according to the present invention having a shunt liner and a return liner.
Figure 5:
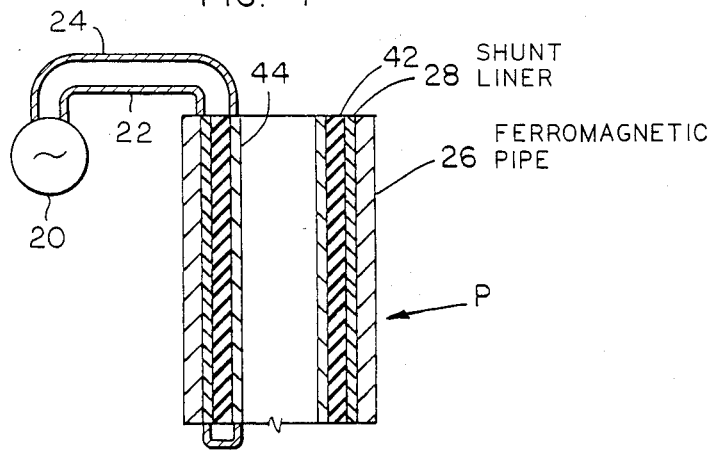
FIG. 5 is a longitudinal cross-section of the pipe shown in FIG. 4.
Figure 6:
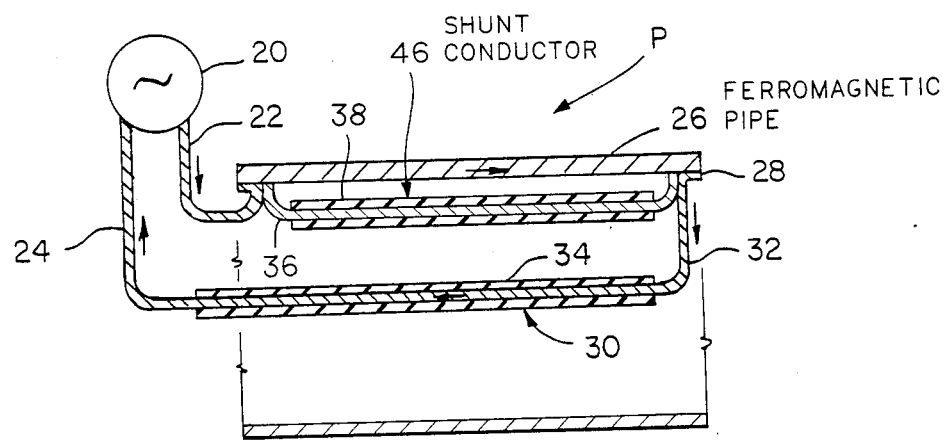
FIG. 6 is a schematic diagram of the pipe shown in FIG. 2.

FIG. 4 shows an improvement of the embodiment of FIG. 3. In this embodiment the return conductor also serves as an inner liner on heat generating pipe P. The ferromagnetic pipe 26 has a first inner lining of shunt conductor 28 followed by an insulation layer 42 followed by the inner lining that comprises the return conductor 44. This can be formed in many different ways using commonly available suitable materials such as thermoplastics or thermoset polymers. The advantage of this embodiment is that once assembled or constructed at the factory it becomes a single unit for field installation, without the need to later install a wire to serve as return conductor 30.

The foregoing disclosure and description of the invention are illustrative and explanatory thereof, and various changes in the size, shape and materials as well as in the details of the illustrated construction may be made without departing from the spirit of the invention, and all such changes being contemplated to fall within the scope of the appended claims.

I claim:

1. A skin effect heat generating pipe for use with a low frequency alternating current power source comprising:
 a ferromagnetic pipe having a thickness substantially greater than the penetration depth of current of the frequency of the power source, said pipe having first and second ends, said first end of said ferromagnetic pipe being connectable to a first terminal of the power source;
 a shunt conductor comprising a conductive layer applied to and in electrical contact with the inner surface of said ferromagnetic pipe substantially throughout the length of said shunt conductor, and shunt conductor and said pipe forming a parallel resistance circuit, where said shunt conductor and said pipe each are capable of conducting substantial current;
 a return electrical conductor installed in said ferromagnetic pipe, said return conductor having a first and a second end, said first end of said return conductor being electrically connected to the second end of said ferromagnetic pipe and said second end of said return conductor being connectable to a second terminal of the power source, said return conductor being electrically insulated from said ferromagnetic pipe at all points away from said return conductor first end;
 whereby heat is generated in said pipe and said shunt conductor in response to the flow of current from the power source through the parallel electrical circuit formed by said pipe and said shunt conductor which is returned to the power source via said return conductor.

2. The heat generating pipe of claim 1, wherein said shunt electrical conductor comprises a discrete inner liner conformed to the inner surface of said ferromagnetic pipe.

3. The heat generating pipe of claim 2, wherein said pipe is formed of steel and said shunt conductor is formed of copper.

4. The heat generating pipe of claim 2, wherein said return conductor comprises insulating means surrounding said return conductor for electrically insulating said return conductor except at the points of connection of said return conductor to said pipe and the power source.

5. The heat generating pipe of claim 4, wherein said return conductor comprises a discrete inner liner conformed to the inner surface of said shunt electrical conductor.

6. The heat generating pipe of claim 5, wherein said return conductor comprises a copper conductor surrounded by electrical insulating material.

7. The heat generating pipe of claim 1, wherein said pipe is formed of steel and said shunt conductor is formed of a copper.

8. A heat generating pipe for use with a low frequency alternating current power source comprising:
   a ferromagnetic pipe having a thickness substantially greater than the penetration depth of current at the frequency of the power source, said pipe having first and second ends, first end of said ferromagnetic pipe being connectable to a first terminal of the power source;
   a copper shunt liner mounted within said pipe, said liner being in electrical contact with the inner surface of said ferromagnetic pipe so that said shunt liner and said pipe form a parallel resistance circuit, where said shunt liner and said pipe each are capable of conducting substantial current;
   an electrically insulated copper return conductor installed in said ferromagnetic pipe, said return conductor having a first and a second end, said first end of said return conductor being electrically connected to the second end of said ferromagnetic pipe and the second end of said return conductor being connectable to a second terminal of the power source, said return conductor being electrically insulated from said ferromagnetic pipe at all points away from said return conductor first end,
   whereby heat is generated in said pipe and said shunt liner in response to the flow of current from the power source through the parallel electrical circuit formed by said pipe and said shunt liner which is returned to the power source via said return conductor.

9. The heat generating pipe of claim 8, wherein said insulated copper return conductor comprises a discrete inner liner conformed to the inner surface of said shunt liner and electrically insulated therefrom.

* * * * *